Feb. 20, 1945.　　L. P. MILLARD ET AL　　2,369,745
HARVESTER THRESHER
Filed Oct. 23, 1940　　7 Sheets-Sheet 5
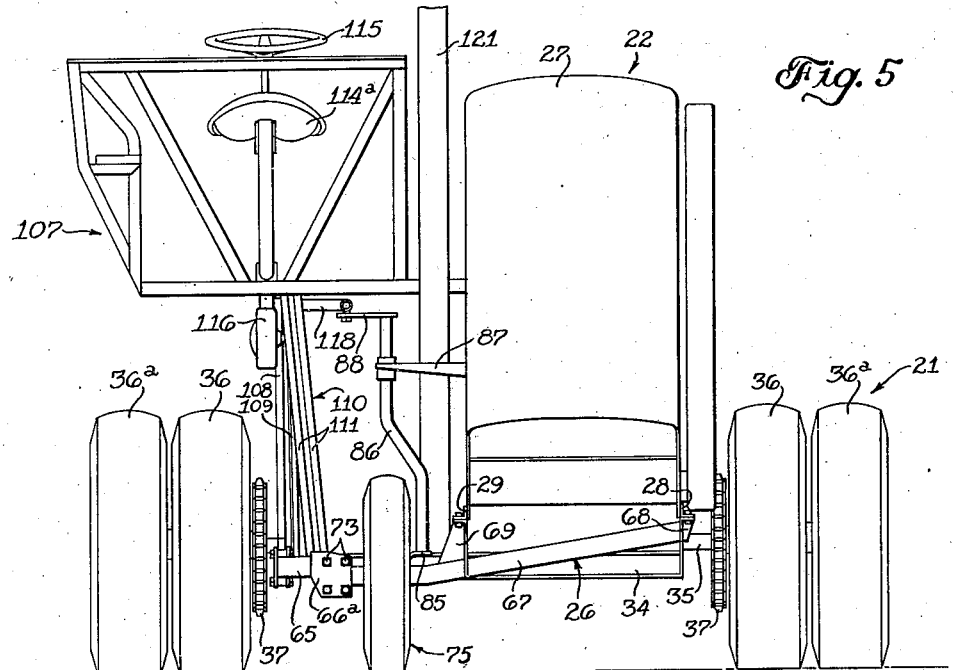
Fig. 5
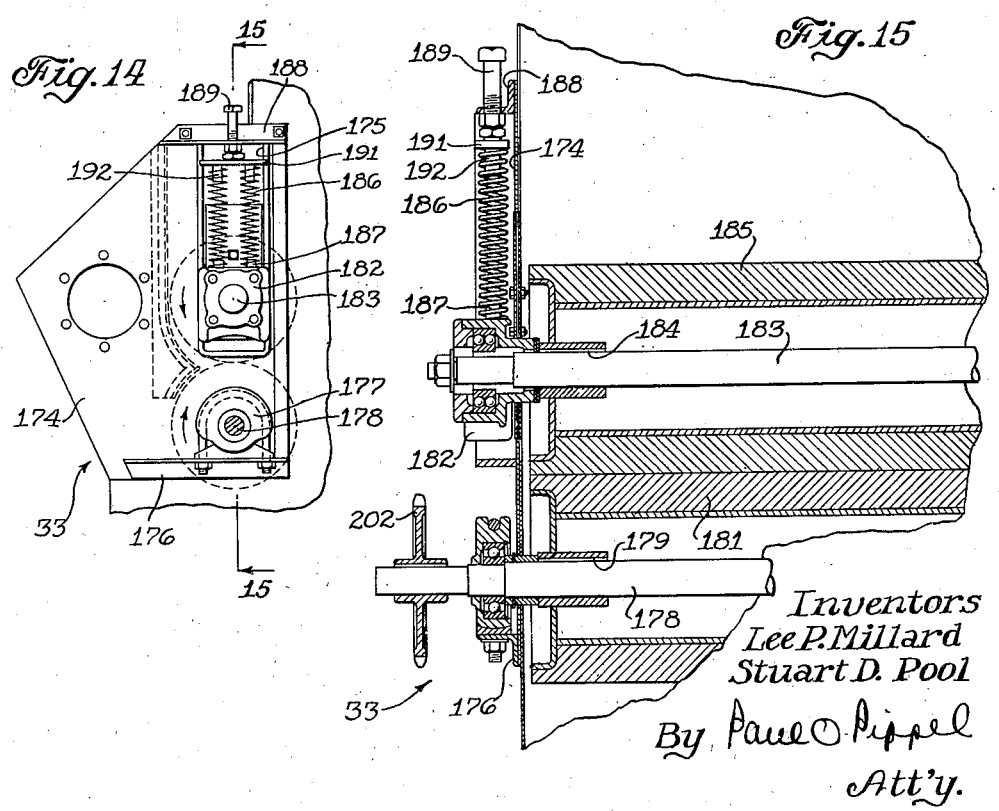
Fig. 14
Fig. 15
Inventors
Lee P. Millard
Stuart D. Pool
By Paul O. Pippel
Att'y.

Feb. 20, 1945.  L. P. MILLARD ET AL  2,369,745
HARVESTER THRESHER
Filed Oct. 23, 1940  7 Sheets-Sheet 6
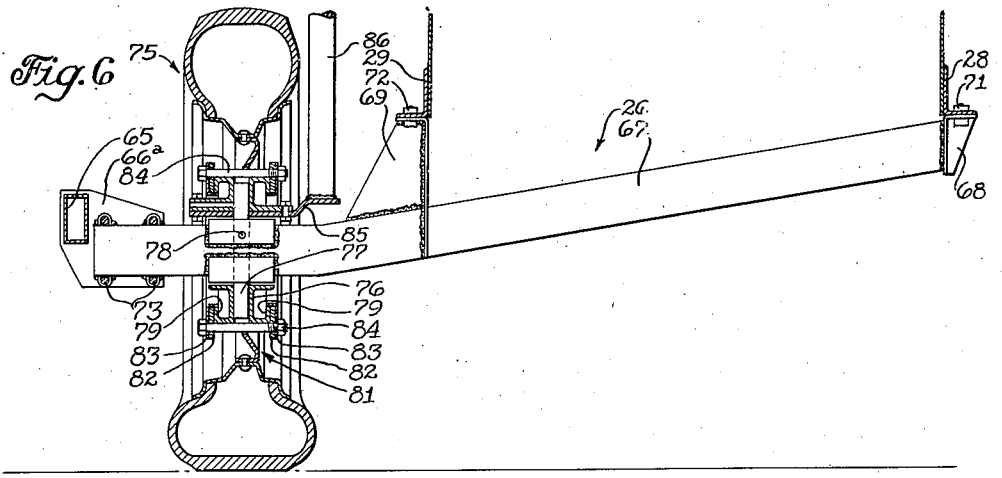
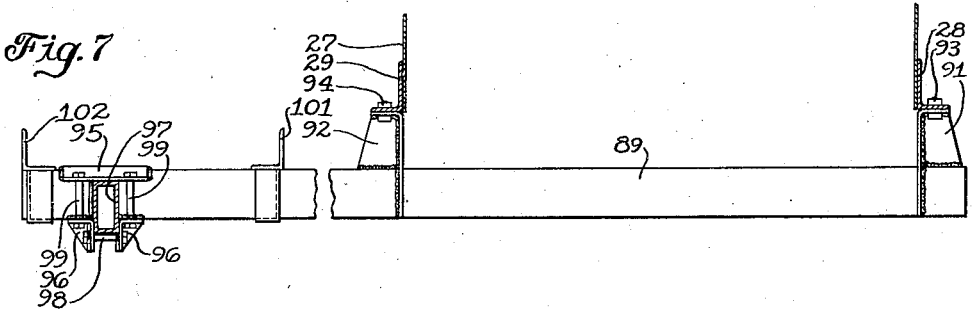
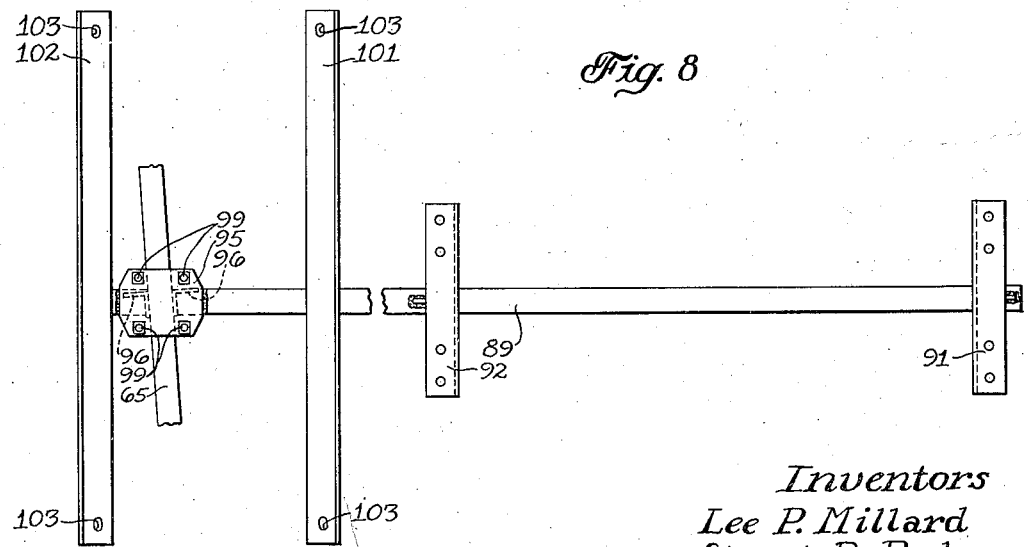
Inventors
Lee P. Millard
Stuart D. Pool
By Paul O. Pippel
Att'y.

Feb. 20, 1945. L. P. MILLARD ET AL 2,369,745
HARVESTER THRESHER
Filed Oct. 23, 1940 7 Sheets-Sheet 7
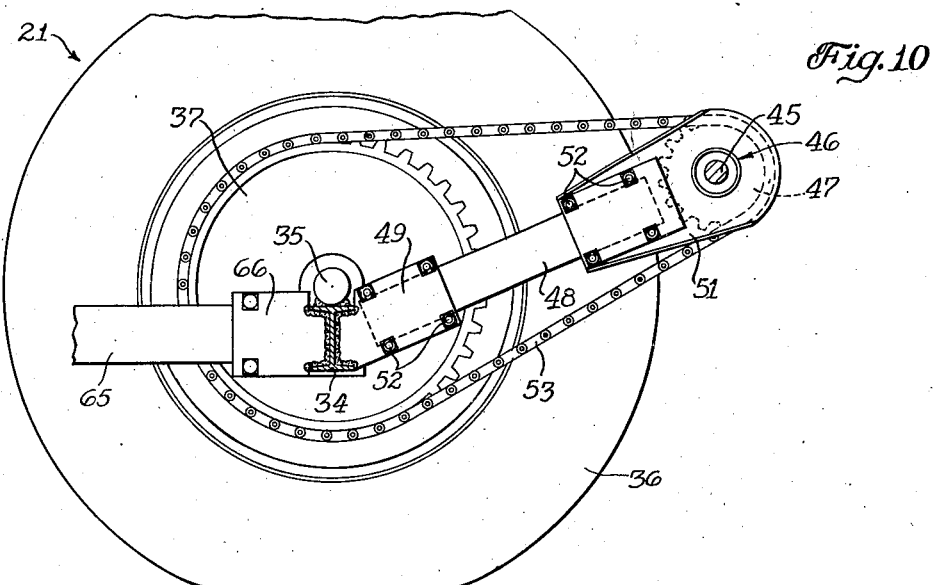
Fig. 10
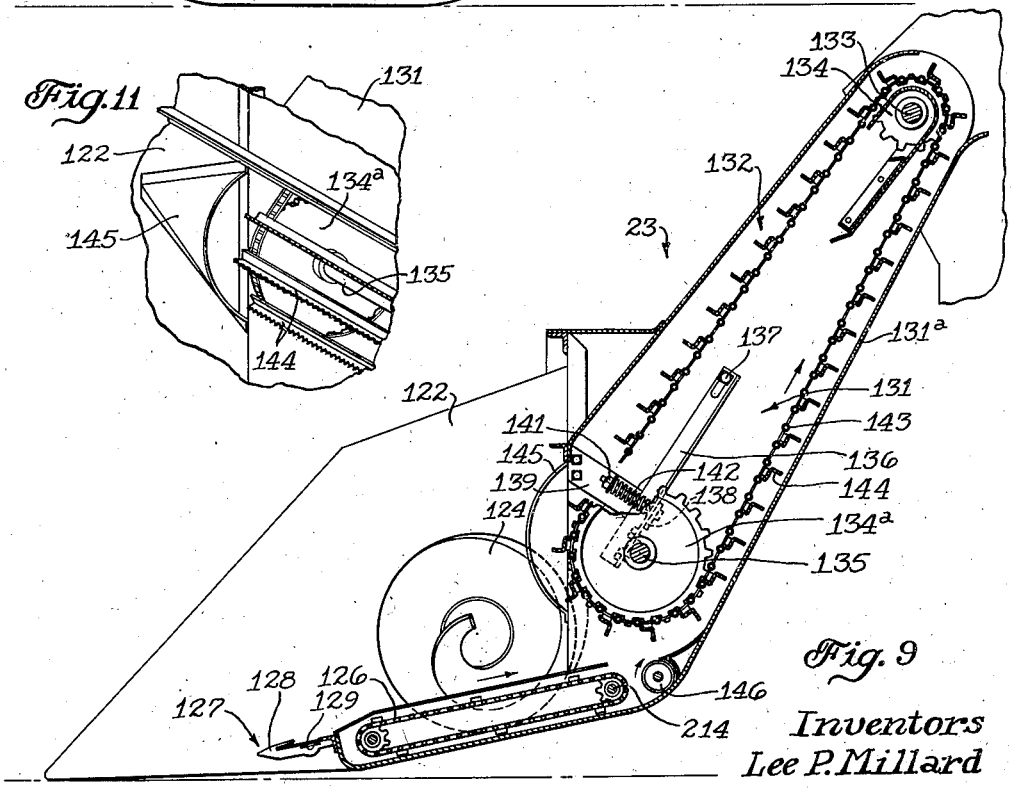
Fig. 11
Fig. 9
Inventors
Lee P. Millard
Stuart D. Pool
By Paul Pippel
Att'y.

Patented Feb. 20, 1945

2,369,745

UNITED STATES PATENT OFFICE 2,369,745

HARVESTER THRESHER

Lee P. Millard and Stuart D. Pool, Moline, Ill., assignors to International Harvester Company, a corporation of New Jersey Application October 23, 1940, Serial No. 362,386

11 Claims. (Cl. 56—21)

This invention relates generally to harvester threshers, and more particularly it relates to a self-propelled type of harvester thresher.

Heretofore, in harvester threshers of this type, the machines have been heavy and difficult to handle. Most generally a heavy framework has been necessary to support the threshing mechanism and the motor, which drives the various parts of the threshing mechanism and also propels the machine over the ground.

With these objectional features in mind, it is the principal object of the present invention to provide a novel arrangement of parts which will produce an improved self-propelled harvester thresher that is small, easy to handle, light in weight, and economical to manufacture.

Another object of the present invention is to provide a novel means for supporting the threshing mechanism and the motor on the wheeled support of the machine. This supporting means permits the threshing mechanism to move relative to the motor as the machine travels over uneven ground. In this way, the usual heavy framework is dispensed with.

Another object of the present invention is to provide a novel motor mounting or supporting means, which also carries the operator's platform. One particular advantage of this arrangement is that the machine is, consequently, much lighter in weight.

A further object of the invention is to provide a front support having laterally spaced traction wheels, on which support the threshing mechanism and the motor are carried. A steerable wheel is provided at the rear of the machine between the threshing mechanism and the motor in such a manner that the weight of the machine is balanced about the rear wheel. It is also an additional object in this regard to provide a novel steerable wheel construction, and a novel means for steering the wheel.

An additional object of the present invention is to provide an improved platform construction in which there is provided an improved feeder. An improved counter-balancing device is also associated with the improved platform construction.

In addition, another object of the present invention is to provide a novel driving means for the various parts of the thresher.

Further, another object of the present invention is to provide a novel mounting for a rubber roll attachment which is provided in front of the threshing cylinder of the threshing mechanism.

By virtue of these particular objects and features, a compact, yet efficient, self-propelled harvester thresher unit is provided which is especially advantageous in small harvester threshers and the like.

These and other objects and advantages of the present invention will be apparent to those skilled in the art after a consideration of the following detailed description of a preferred structural embodiment, taken in conjunction with the accompanying sheets of drawings.

In the drawings:

Figure 5 is a rear view of the harvester thresher shown in Figure 1;

Figure 6 is a section taken along the line 6—6 of Figure 1, and shows the rotatably mounted steerable wheel construction which is mounted on the member that connects the threshing mechanism and the motor support;

Figure 7 is a section taken along the line 7—7 of Figure 1, and shows the novel motor support;

Figure 8 is a plan view of the motor support shown in Figure 7;

Figure 9 is a sectional view, taken along the line 9—9 of Figure 1, and shows the novel platform and feeder construction;

Figure 10 is a sectional view, taken along the line 10—10 of Figure 1, and shows the novel means for driving the traction wheels on the support of the harvester thresher;

Figure 11 is a perspective view of the novel feeder construction;

Figure 12 is a sectional view taken along the line 12—12 of Figure 4;

Figure 13 is a sectional view taken along the line 13—13 of Figure 12;

Figure 14 is a side view of the separator, showing the novel rubber roll attachment;

Figure 15 is a sectional view taken along the line 15—15 of Figure 14; and,

Figure 16 is a sectional view, taken along the line 16—16 of Figure 4, and shows the pivotal connection of the motor to the wheeled support.

Figure 1:
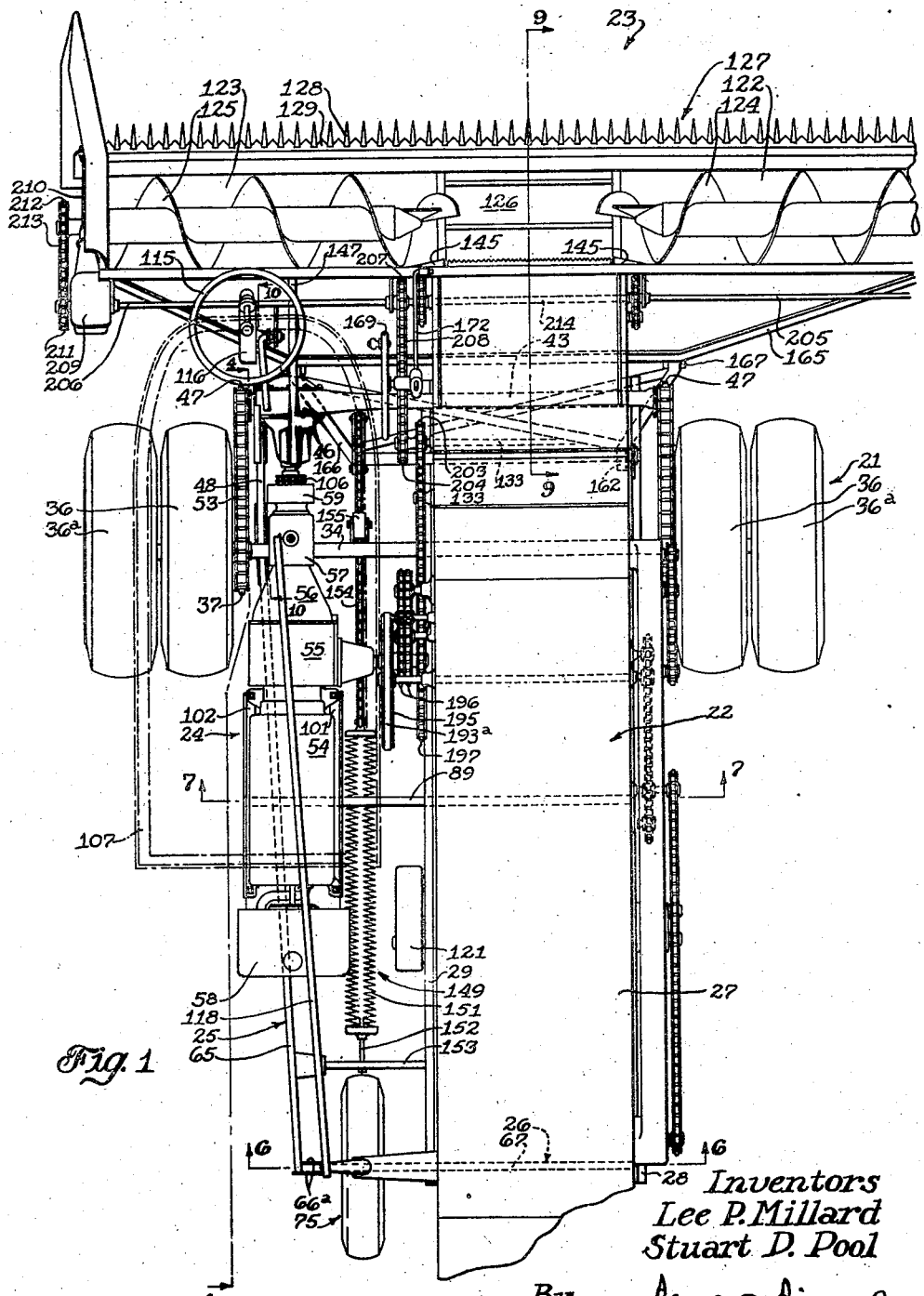
Figure 1 is a top view of a self-propelled harvester thresher embodying the features of the present invention.

Referring now to the drawings, more particularly to Figures 1, 2, 3, and 4, it will be seen that the harvester thresher chosen to illustrate the principles of the present invention comprises a transversely disposed wheeled support 21, on which is secured a threshing mechanism 22, at the front of which is pivotally mounted a unit 23. Adjacent the threshing mechanism 22, a motor 24 is supported on the wheeled support 21, and on a motor support 25. The rear of the motor support 25 is connected to the rear of the threshing mechanism 22 by a transverse member 26.

The threshing mechanism 22 is enclosed in an inverted U-shaped housing 27, which has secured along the lower edges thereof angle members 28 and 29. Within the U-shaped housing 27 is mounted the usual threshing cylinder 31, which is adapted to cooperate with the usual grate bar structure 32. Other conventional threshing means, not shown, is also provided in the housing 27. A rubber roll attachment 33 is mounted ahead of the threshing cylinder 31.

Figure 3:
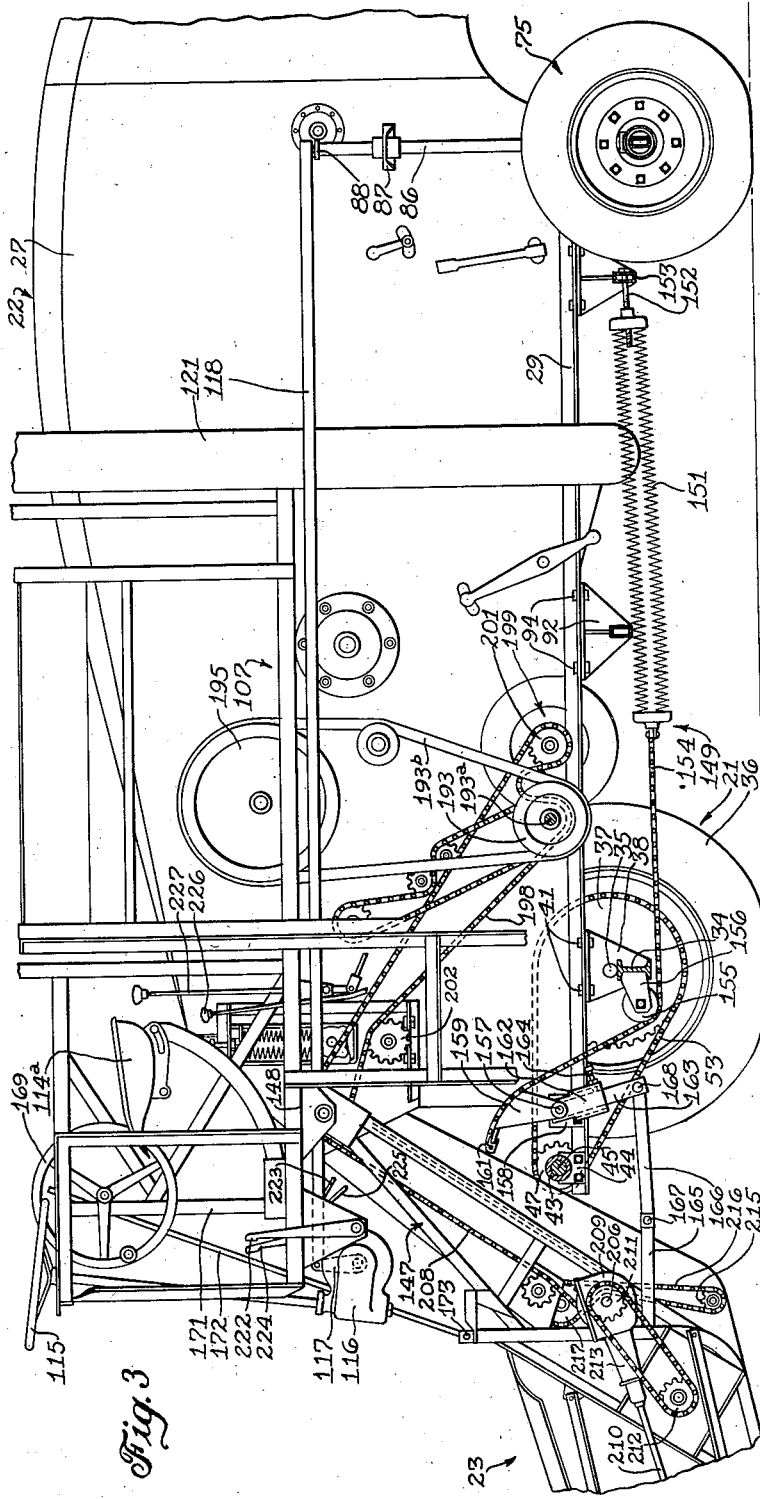
Figure 3 is a side view of the machine shown in Figure 1, taken from the left side of the machine.

Referring now to Figure 3, it is to be noted that the wheeled support 21 consists of a transverse I-beam 34, which has secured at the ends thereof axle portions 35 on which are rotatably mounted traction wheels 36 and 36ª; a sprocket 37 is secured to each of the traction wheels 36. As shown in Figure 3, the front end of the U-shaped housing 27 is supported on plate members 38 and 39, which are provided on the axle 34. The angle member 29 is secured to the plate member 38 by bolts 41, and the angle member 28 is secured to the plate member 39 by the bolts 42.

Referring now to Figures 1 and 3, it is to be noted that the threshing mechanism 22, which is enclosed in the U-shaped housing 27, is secured to the wheeled support 21 approximately to one side of a center line between the traction wheels 36 of the wheeled support 21. The angle members 28 and 29 extend forwardly of the I-beam axle 34, and a transversely positioned housing 43 is secured to the angle members 28 and 29 by suitable bracket structures 44. Within the housing 43 is rotatably mounted a shaft 45, with which is associated a differential 46. The shaft 45 extends beyond the ends of the housing 43 and has a sprocket 47 secured to each end thereof. As shown in Figures 1 and 10, one end of the housing 43 is supported from the I-beam axle structure 34 by a suitable brace member 48 which is connected between a pair of spaced plates 49 that are secured on the I-beam axle structure 34, and between a pair of spaced plates 51 which are secured to and extend from the axle housing 46. Bolts 52 secure the brace member 48 to the spaced plates 49 and 51. Suitable chains 53 are trained around the sprockets 47 provided at the ends of the shaft 45, and around the sprockets 37 associated with the traction wheels 36. The motor 24 is operatively associated with the differential 46 on the housing member 43.

Figure 4:
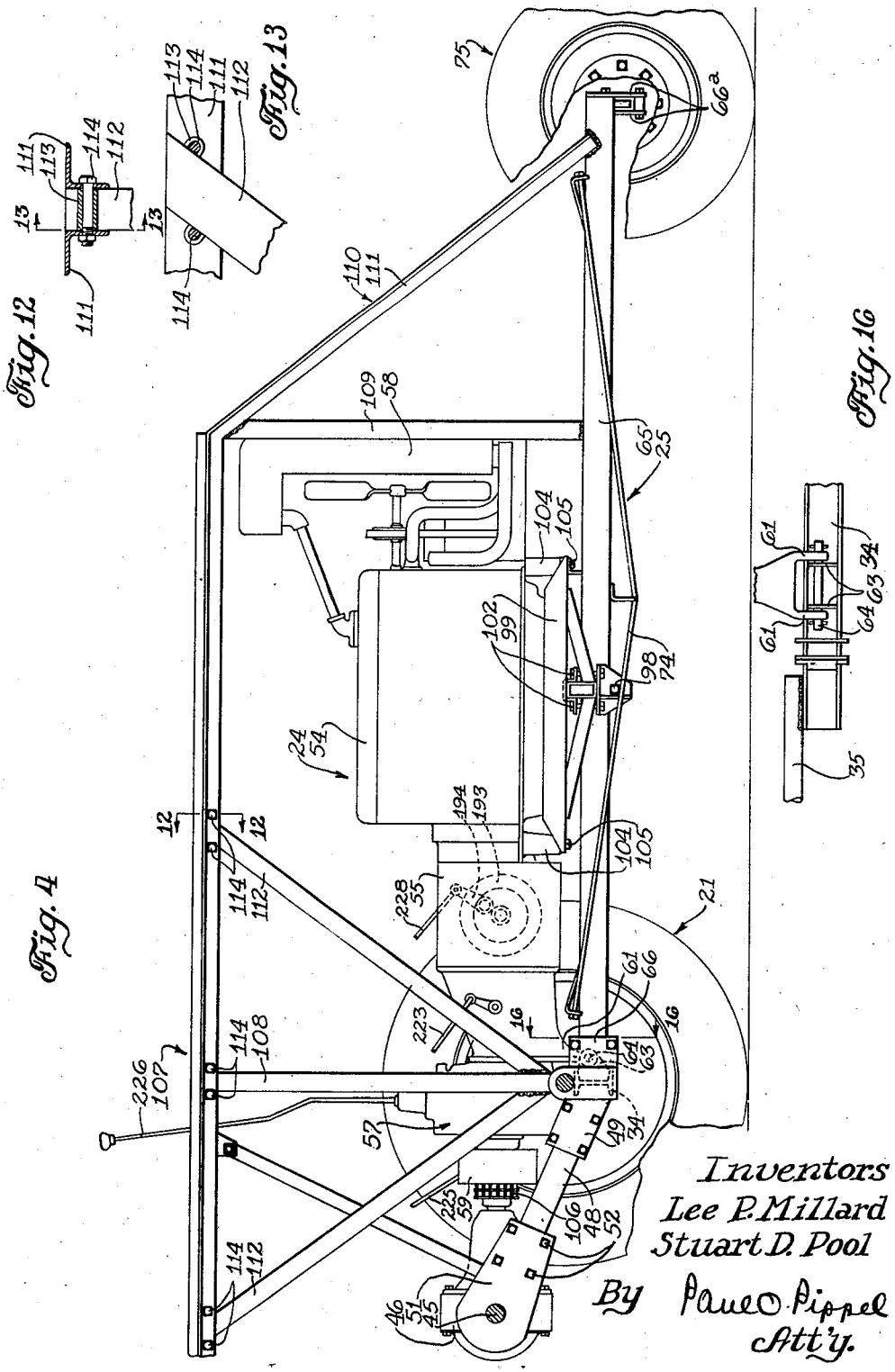
Figure 4 is a side view, taken along the line 4—4 of Figure 1, and shows the motor and the novel mounting and supporting means of the present invention.

The motor 24 consists of an engine 54, a flywheel housing 55, a clutch housing 56, and a transmission 57, all of which are secured together to form one rigid unit. The usual radiator structure 58 is provided at the front of the engine 54. The front of the transmission 57 is provided with a brake drum 59, which is associated with a shaft which extends from the transmission 57. The clutch housing 56 is provided with a pair of downwardly depending lugs 61 in which there is provided alined openings. The motor unit, by these downwardly depending lugs 61, is pivotally connected to the I-beam member 34 by a pair of spaced plates 63, which are secured to the I-beam 34, and in which is provided a pair of alined openings, as shown in Figures 4 and 16. A pin 64 is inserted in the alined openings in the lug 61 and in the alined openings in the plate 63. The rear end of the motor 24 is supported on a motor support 25.

The motor support 25 comprises a longitudinally disposed member 65 which is secured between a pair of spaced plates 66 that are secured to the transversely disposed I-beam 34. The rear of the member 65 is provided with a pair of spaced plates 66ª, which extend transversely thereto. The transverse member 26, which connects the longitudinal member 65 to the angle members 28 and 29, comprises a piece of square tubing 67, to which are secured attaching brackets 68 and 69. The bracket 68 is secured to the angle member 28 by bolts 71, and the bracket 69 is secured to the angle member 29 by bolts 72, as shown in Figure 6. The square piece of tubing 67 extends outwardly between the transverse plates 66ª on the longitudinal member 65, and is secured thereto by bolts 73. The longitudinal member 65 is reenforced by an adjustable truss rod 74. On the square piece of tubing 67, between the longitudinal member 65 and the separating mechanism 22, is rotatably mounted a steerable wheel 75, which supports the rear of the machine.

The steerable wheel 75 comprises a member 76, which is mounted for angular movement on a vertical pin 77 secured to the square piece of tubing by a pin 78. The member 76 is provided with a pair of radial flanges 79, with which is associated a wheel hub 81. Circular rings 82 are associated with each of the radial flanges 79 and are enclosed by a sheet metal flange 83, which flange and ring are secured to the wheel hub 81 by bolts 84. By virtue of this construction, the wheel 75 encircles the transverse member 67, and is angularly adjustable and rotatable with respect thereto. As shown in Figure 1, the wheel 75 is positioned between the motor 24 and the separating mechanism 22 so that the weight thereof will be equally distributed on the wheel 75. An arm 85 extends from the hub member 76, and a vertical spindle 86 is secured thereto. The spindle 86 extends upwardly and is journaled in a bracket 87, which is secured to the side of the U-shaped housing 27. An arm 88 is provided at the upper end of the spindle 86.

A mid-point of the longitudinal member 65 is connected to the U-shaped housing 27 by a transverse motor support 89, on which are provided brackets 91 and 92. The bracket 91 is secured to the angle member 28 by bolts 93, and the bracket member 92 is secured to the angle member 29 by bolts 94. The transverse motor support 89 extends outwardly laterally into association with the longitudinal member 65. As shown in Figure 7, the outwardly extending portion of the transverse motor support 89 is provided with a horizontal bracket 95 and a pair of spaced vertical brackets 96. The horizontal bracket 95 reenforces an opening 97, which is provided near the end of the transverse motor support 89. The opening 97 straddles the longitudinal member 65, and the brackets 96 are clamped together by the bolts 98, and the horizontal bracket 95 is secured to the top of the brackets 96 by vertical bolts 99. At the end of the transverse motor support 89 is welded a pair of longitudinally arranged angles 101 and 102, at the ends of which are provided openings 103. The engine 54 is secured on the longitudinal angles 101 and 102, as shown in Figure 4.

The engine 54 is provided with downwardly depending legs 104, which are alined with the openings 103 at the ends of the angle members 101 and 102. Bolts 105 are inserted in the openings in the angle members 101 and 102 and secure the legs 104 of the engine 54 to said angle members. By virtue of this novel motor mounting, the motor is pivotally mounted on the wheeled support of the machine, and the rear of the motor is carried by the longitudinal member 65, which is in turn carried by the steerable wheel 75, and the intermediate portion of the member 65 is supported by the transverse motor support 89. In the event that the longitudinal member 65 twists as the machine travels over uneven ground, the rear end of the motor may move upwardly or downwardly about its pivotal connection to the wheeled support 21. In this way the usual heavy framework for supporting the motor is eliminated. As shown in Figure 4, the driving shaft, which extends out of the transmission 57, is operatively connected to a drive shaft which extends from the differential 46 by a chain coupling 106. This coupling permits the normally alined shafts of the transmission 57 and differential 46 to move relative to one another as the motor pivots about the pin 64, which pivotally connects the motor to the wheeled support. On the motor support 25 is mounted an operator's platform 107.

As shown in Figure 4, a vertical member 108 extends from the transverse I-beam 34, and a vertical member 109 extends from the longitudinal member 65. A diagonal brace 110 consists of angle members 111 that are welded to each side of the upper end of the vertical member 109 and the rear of the longitudinal member 65. The angle members 111 extend forwardly and are connected to the upper ends of the vertical members 108 and 109. Brace members 112 are secured at their lower ends to the vertical member 108 and extend upwardly between the angle members 111. As shown in Figures 12 and 13, the ends of the members 108 and 112 are provided with semicircular portions 113, in which there is provided an opening that is alined with suitable openings in the angle members 111. Bolts 114 are inserted through the alined openings, and secure the members 108 and 112 to the longitudinal angle members 111. As shown in Figure 3, the front of the operator's platform 107 is provided with an operator's station 114ª and a steering wheel 115, and the controls for the various parts of the harvester thresher. The steering wheel 115 extends downwardly into a casting 116 in which there is provided the usual worm and worm gear assembly, with which is associated a rotatable arm 117. A longitudinally disposed bar 118 connects the arm 88 on the spindle 86 of the rear wheel 75 with the rotatable arm 117. By virtue of this construction, the operator may steer the wheel 75 from his station 114ª. A grain tank 119 is also carried by the operator's platform 107. An elevator 121 extends vertically from the threshing mechanism 27 so as to convey the threshed grain into the grain tank 119.

The unit 23 is positioned transversely ahead of and extends laterally to each side of the threshing mechanism 22, and is pivotally connected to the U-shaped housing 27. The unit 23 comprises a transverse platform formed of right and left curved sheet metal troughs 122 and 123, which extend upwardly and form a rear vertical wall, and in which are rotatably mounted open end augers 124 and 125, as shown in Figures 1 and 9. Between the open ends of the augers 124 and 125, a longitudinal conveyor 126 is provided in the platform 23. Across the front of the platform is provided the usual cutting mechanism 127 which consists of finger guards 128 and a reciprocating sickle 129. The cutting mechanism 127 cuts the standing grain, and the augers 124 and 125 convey it onto the longitudinal conveyor 126, which in turn conveys the grain into a feeder housing 131 of the platform 23.

The feeder housing 131 extends rearwardly from the center of the platform and has an undershot conveyor 132 mounted therein. At the upper end of the feeder housing 131 is journaled a shaft 133 on which sprockets 134 are secured. The shaft 133 extends beyond the sides of the feeder housing 131 and is journaled in the sides of the U-shaped housing 27. As shown in Figure 9, the undershot conveyor 132 consists of sprockets 134ª, which are rotatably mounted on a shaft 135 that has a link 136 secured to each end thereof. The links 136 extend rearwardly and upwardly and are pivotally connected to the sides of the feeder housing 131 by bolts 137. The links 136 are adapted to rest on the flange 138 of a bracket 139 which is also secured to each side of the feeder housing 131. A bolt 141 is inserted through alined openings in the link 136 and the flange 138, and a spring 142 is provided on the bolt 141, and is adapted to rest against the link 136. By this construction, the lower end of the undershot conveyor is held against clockwise movement, but may yieldingly rise in a clockwise direction. It is to be noted from Figure 9 that the sprockets 138 are positioned so as to overhang the end of the longitudinal conveyor 126, and extend beyond the vertical walls of the troughs 122 and 123. Chains 143, connected by serrated angle members 144, are trained around the sprockets 134 and 134ª.

As previously mentioned, the auger conveyors 124 and 125 move the cut material toward the center of the platform 23 and onto the longitudinal conveyor 126. Since the lower end of the undershot conveyor 132 overhangs the longitudinal conveyor 126, and moves upwardly beyond the rear wall of the trough 122, some of the grain would lodge itself in the lower end of the conveyor 132. To prevent this, a conical-shaped shield 145 is provided on the rear wall of the trough 122 at each end of the conveyor 132. As shown in Figure 9, the shield 145 is positioned on the back wall of the trough 122 so that, as the lower end of the conveyor 132 moves upwardly, the shield will move the grain around the end of the conveyor 132. The serrated angle members 144 then grasp the grain and move it rearwardly along the feeder bottom 131ª of the feeder housing 131 and into the threshing cylinder 31. A stripper roll 146 is rotatably mounted at the rear of the conveyor 126 so as to clean the cut grain therefrom and to prevent the conveyor 126 from carrying the grain underneath the conveyor 126.

The unit 23 is pivotally connected to the front of the U-shaped housing 27 by the shaft 133. As shown in Figures 1 and 3, this pivotal connection is stabilized by a structure 147 which extends rearwardly from the left side of the unit 23. The structure 147 is pivotally connected to a bracket 148, which is secured to the underside of the operator's platform 107 in alinement with the shaft 133. The unit 23 is counterbalanced about its pivotal connections to the U-shaped housing 27 and the operator's platform 107 by a counterbalancing mechanism 149.

The counterbalancing mechanism 149 comprises a longitudinally disposed nest of springs 151, one end of which is adjustably secured by a bolt 152 to a transverse member 153 that is connected between the angle member 29 and the longitudinally disposed member 65. The other end of the nest of springs 151 is connected to a chain 154 which extends forwardly and is trained around a pulley 155 that is pivotally mounted on a bracket 156 on the I-beam axle 34, as shown in Figure 3. The end of the chain 154 is associated with a rock-shaft 157.

The rock-shaft 157 is journaled in suitable brackets 158, which are secured to the angle members 28 and 29 forwardly of the member 34. On the rock-shaft 157 is secured a cam 159 over which extends the chain 154 which is connected thereto by a pin 161. A pair of arms 162 extend downwardly from the rock-shaft 157. An arm 163 is pivotally mounted on each of the arms 162 and is adjusted with respect to the arm 162 by means of a set screw 164, as shown in Figure 3. Referring now to Figure 1, it should be noted that the unit 23 is provided with a rearwardly and inwardly extending brace 165, which is connected to the outer ends of the troughs 122 and at a mid-portion is arranged parallel to and spaced from the troughs 122. The brace 165 is connected to the arm 163 by a horizontally disposed link structure 166. The link structure 166 is pivotally connected to the brace 165 by a bolt 167 and to the arm 163 by bolts 168. By virtue of this arrangement of parts, the weight of the unit 23 tends to rotate the rock-shaft 157 in a counterclockwise direction wherein the cam 159 on the rock-shaft also moves in a counterclockwise direction and the chain 154 exerts a force on the nest of springs 151. When the tension on the nest of springs 151 needs to be changed, this adjustment can be accomplished by adjusting the bolt 152.

The unit 23 or, more particularly, the platform is adjusted by a crank wheel 169, which is positioned adjacent the operator's station 114ª. The crank 169 is mounted on a suitable support 171 which is mounted on the operator's platform 107. A rod 172 extends from the crank 169 and is pivotally connected to the rear framework of the platform 23 by a bent end portion 173. The crank 169 and the rod 172 are connected by the usual rack and pinion type of connection wherein, upon rotation of the crank 169, the rod 172 is moved upwardly or downwardly, which adjusts the unit 23 upwardly or downwardly about its pivotal connection to the U-shaped housing 27. It will also be appreciated that the hand wheel 168 may be easily adjusted, since the counterbalancing mechanism 149 aids in the adjustment of the unit 23. At the rear of the pivotal connection of the unit 23 to the U-shaped housing 27 is mounted a pair of rubber rolls which constitute the rubber roll attachment 33, previously referred to.

Figure 2:
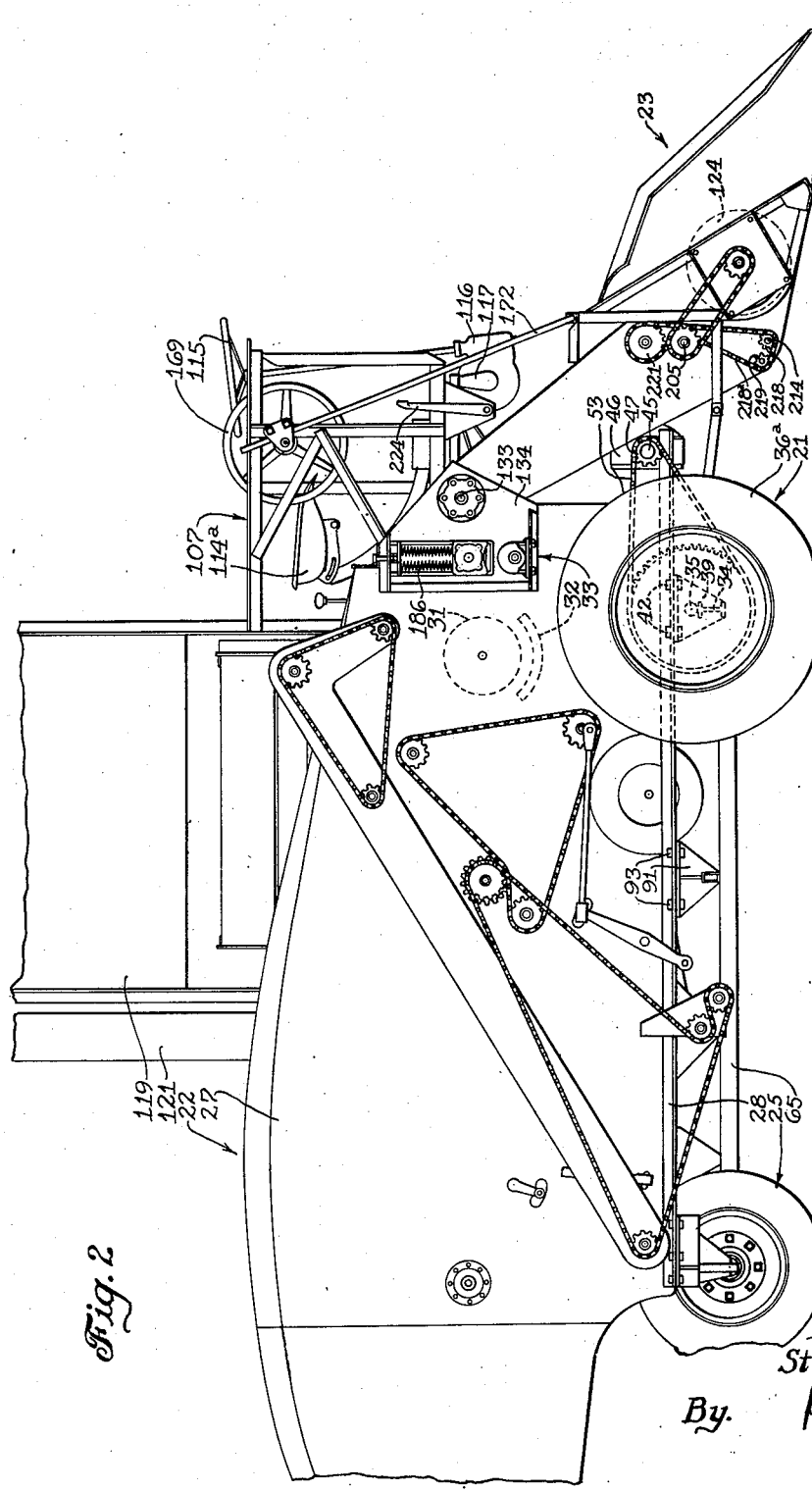
Figure 2 is a side view of the machine shown in Figure 1, taken from the right side of the machine.

Referring now to Figures 2, 14, and 15, it is to be noted that the sides of the U-shaped housing 27 are reenforced with a plate member 174, in which there is provided an elongated opening 175. Near the lower surface of the plate member 174 is secured an angle member 176, on which is secured a bearing 177 in which is rotatably mounted a shaft 178. On the shaft 178 is secured, by a key 179, a rubber roll 181. Since only the mounting for the left-hand side of the rubber roll is shown in Figure 15, it is to be understood that a similar construction is provided at the other side of the machine. In the elongated opening 175 is slidably mounted a bearing block 182, in which is journaled a shaft 183, and on which is secured, by a key 184, a rubber roll 185. The outer periphery of the rubber rolls are adapted to contact each other and are held yieldingly in engagement with one another by a pair of springs 186. One end of the springs 186 is adapted to seat itself on projections 187 provided on the bearing block 182. The open end of the elongated opening is connected by a member 188 in which is threaded an adjusting bolt 189 at the end of which is provided a plate member 191. The plate member 191 is provided with projections 192 which are adapted to engage the other end of the springs 186. By adjusting the bolts 189, tension may be increased on the springs 186, which in turn controls the amount of vertical movement of the rubber rolls 185. There are many advantages to mounting this rubber roll attachment in this particular manner, since the upper roll 185 may be easily and quickly removed from the U-shaped housing 27. To remove the upper roll 185, the bracket 188 need only be removed and the entire upper rubber roll 185, and the bearing blocks 182 therefor, may be moved upwardly out of the elongated opening 175. The lower rubber roll 181 is maintained in the machine, since it serves as a beater for guiding the grain from the feeder housing 131 into the threshing cylinder 31. Drive of the various parts of the machine and of the threshing wheels 36 and 36ª is effected through the motor 24.

On a shaft 193ª, which extends from the flywheel housing 55 of the motor 24, is provided a pulley 193 with which is associated any suitable type of clutch mechanism 194. As shown in Figure 3, a belt 193ᵇ is trained around the pulley 193 and around a pulley 195 provided on the shaft of the cylinder 31. As previously explained, the traction wheels 36 and 36ª are driven from the shaft 43, which is operably connected to the transmission 57 by the connecting means 106. The various parts of the harvester thresher are driven from the pulley 193. Adjacent the pulley 193 and on the shaft 193ª is secured a pair of sprockets 196 and 197. The sprocket 197 effects a drive through a chain 198 to a thresher fan 199, the lower rubber roll 181, and the shaft 133 of the undershot conveyor 132. The chain 198 is trained around a sprocket 201, which is provided on the shaft of the fan 199, and around a sprocket 202 provided at the left end of the lower rubber roll 181, and around a sprocket 203, which is secured to the shaft 133. The chain 198 effects the drive of the rubber roll 181 and the undershot conveyor 132 in the direction indicated by the arrows in Figures 9 and 14. From the shaft 133 various parts of the platform 23 are driven. On the shaft 133 is secured a sprocket 204. At each side of the platform 23 are rotatably mounted shafts 205 and 206. On the shaft 206 is secured a sprocket 207, and a chain 208 is trained about the sprockets 204 and 207 so as to drive the shaft 206. At the left end of the shaft 206 is mounted a gear box 209, from which extends a shaft 210 that is operatively connected to the cutting mechanism 127 in the usual manner. Adjacent the gear box 209 is mounted a sprocket 211, and a sprocket 212 is journaled on the end of the auger 125. A chain 213 is trained around the sprocket 211, the sprocket 212, and drives the auger 125. The shaft 205 is driven from the shaft 206 through the rear shaft 214 of the longitudinal conveyor 126. As shown in Figure 3, a sprocket 215 is provided on the end of the shaft 214, and a chain 216 is operatively connected therewith and with a suitable sprocket provided on the shaft 206 and a chain tightener sprocket 217. Through the chain 216 the shaft 214 is driven. As shown in Figure 2, on the other end of the shaft 214 is provided a sprocket 218, and a sprocket 219 is provided at the end of the stripper roll shaft 146. A chain 218ᵃ is trained around the sprockets 218 and 219 and around a suitable sprocket provided on the shaft 205, and around an idler sprocket 221. In this manner the shaft 206 is driven by the chain 208, from which shaft the longitudinal conveyor 126 and the stripper roll 146 are driven. From the drive of the longitudinal conveyor 126, and through the chain 221, the shaft 205 is driven. As shown in Figure 2, the auger 124 is driven by a suitable connection similar to the connection provided at the left side of the platform 23.

The controls for the various drives of the harvester thresher are provided on the operator's platform 107 near the operator's station 114ᵃ. As shown in Figures 2, 3, and 4, a clutch pedal 222 is pivotally mounted on the operator's platform 107, and is connected to a clutch provided in the clutch housing 56 by a rod 223. Adjacent the clutch pedal 222 is pivotally mounted a brake pedal 224 that is connected to the brake 59 by a rod 225. The gear shift lever 226 extends upwardly from the transmission 57, through an opening in the operator's platform 107, and near to the operator's station 114ᵃ. The gear shift lever 226 starts and stops the drive to the traction wheels 26 and 26ᵃ in the usual manner. A lever 227 controls the clutch 194. A rod 228 connects the lever 227 and the clutch 194, by which, upon movement of the lever 227, the pulley 193 and the gears 196 and 197 are started and stopped.

From the foregoing description it should be apparent that an improved self-propelled type of harvester thresher has been provided. By virtue of this construction, the principal object of the invention has been accomplished by providing a small and light-weight harvester thresher. The novel mounting of the motor on the harvester thresher has also contributed to the construction of a light-weight and easily handled harvester thresher. The machine may be easily steered from the operator's station by virtue of the novel wheel mounting which supports the rear of the entire machine. The improved feeder device permits the platform to be closely connected to the separating mechanism of the harvester thresher, and is so constructed as to efficiently convey the grain from the platform into the threshing mechanism. A rubber roll attachment has been provided for the threshing mechanism, which may be quickly and easily removed if so desired.

It is to be understood that, while a preferred construction embodying the principles of the present invention has been shown in the drawings, the invention is not to be limited to the specific details shown and described, but that, in fact, widely different means may be employed in the broader aspects of my invention.

What is claimed is:

1. In a self-propelled unitary harvester thresher, a transverse support having a pair of laterally spaced traction wheels, threshing mechanism comprising a longitudinally disposed housing carried at its front end on said transverse support, a longitudinally extending frame member disposed alongside said housing and having its front end connected to said transverse member, a second transverse member connected between the rear ends of the housing and longitudinal frame member, a controllable tiller steering wheel journally carried by the second transverse member between the housing and longitudinal frame member to support the rearward portion of the threshing mechanism, an operator's station disposed over the first transverse support, and means at said station and connected with the tiller wheel to angle the same for steering the harvester thresher.

2. In a harvester thresher, a transverse support at the ends of which are rotatably mounted traction wheels, a threshing mechanism carried by the transverse support, a longitudinal member carried by the transverse support, a transverse member rigidly connected to the rear of the threshing mechanism and to the rear of the longitudinal member, a hub member encircling the transverse member and mounted thereon for movement about a vertical axis, a wheel encircling the hub member and rotatably mounted thereon, and an arm extending from said hub member for moving said hub member.

3. In a harvester thresher, a transverse support having a pair of laterally spaced traction wheels, a threshing mechanism secured to the support and extending to one side thereof, a member secured to the support and extending rearwardly alongside of the threshing mechanism, a transverse member rigidly connected to the rear of the threshing mechanism and to the rear of the member, a vertical pin associated with said transverse member, a hub member encircling the transverse member and pivotally mounted on the vertical pin, a wheel hub rotatably mounted on said hub member, and an arm extending from the hub member for moving said hub member about its pivotal connection to the vertical pin.

4. In a harvester thresher, a transverse support having a pair of laterally spaced traction wheels, a threshing mechanism secured to the support and extending to one side thereof, a longitudinal member secured to the support and extending rearwardly alongside of the threshing mechanism, an operator's platform carried by said longitudinal member, a transverse member rigidly connected to the rear of the threshing mechanism and to the rear of the longitudinal member, a hub member encircling the transverse member and mounted thereon for relative angular movement, a wheel rotatably mounted on the hub member, an arm extending from the hub member, and a control means positioned at the operator's platform and operatively connected to the arm on said hub member for moving said wheel about its connection to the transverse member.

5. In a self-propelled harvester thresher, a transverse support, wheels carrying the ends thereof, a longitudinal thresher carried on the support, a longitudinal frame carried on the support to one side of the thresher, the thresher and frame both extending rearwardly of the support, a transverse platform carried in advance of the support for up and down movement from the forward end of the thresher, said thresher and platform having operative parts to be driven, a motor carried on the support and longitudinal frame independently of the thresher and having connections for driving the operative parts of the harvester and thresher, a wheel support proximate the rear ends of the frame and thresher, and a transverse member rigidly connected to the thresher and to the longitudinal frame at their rear ends, said latter wheel being steerably mounted on the transverse member in a position to carry the weight of the rear end of the motor and thresher.

6. In a harvester thresher, a transverse support having a pair of laterally spaced traction wheels, a threshing mechanism secured to the support and extending rearwardly thereof, a longitudinal member secured to the support and extending rearwardly thereof, a transverse member rigidly secured to the rear of the threshing mechanism and to the rear of the longitudinal member, a steerable wheel rotatably mounted on the transverse member between the threshing mechanism and the longitudinal member, a platform pivotally connected to the front of the threshing mechanism and extending laterally to each side thereof, a transverse rock-shaft journaled on the front of the threshing mechanism, arms secured to the rock-shaft and extending above and below said rock-shaft, link means connecting the platform and the arms extending below the rock-shaft, and spring means connected to an arm extending above the rock-shaft and to a second transverse member secured to the rear of the longitudinal member and the threshing mechanism.

7. In a harvester thresher, a transverse support having a pair of laterally spaced traction wheels, a threshing mechanism secured to the support and extending rearwardly thereof, a longitudinal member secured to the support and extending rearwardly thereof, a transverse member rigidly secured to the rear of the threshing mechanism and to the rear of the longitudinal member, a steerable wheel rotatably mounted on the transverse member between the threshing mechanism and the longitudinal member, a platform pivotally connected to the front of the threshing mechanism, a rock-shaft journaled on the front of the threshing mechanism, arms secured to the rock-shaft and extending above and below said rock-shaft, link means connecting the platform and the arms extending below the rock-shaft, and spring means connected to an arm extending above the rock-shaft and extending downwardly under the support and thence rearwardly between the threshing mechanism and the longitudinal member and secured to the rear of said mechanism and member.

8. In a harvester thresher, a support having a pair of laterally spaced traction wheels, a longitudinally arranged threshing mechanism secured to the support and extending rearwardly thereof, a longitudinal member secured to the support and extending rearwardly thereof, a transverse member rigidly secured to the rear end of the longitudinal member and to the rear end of the threshing mechanism, a wheel support mounted on the transverse member, a harvester platform pivotally connected to the front of the threshing mechanism, a rock-shaft carried by the threshing mechanism ahead of the support, link means operatively connecting the rock-shaft and the platform, spring means operatively connected to the rock-shaft and extending downwardly under the support and thence rearwardly between the longitudinal member and threshing mechanism, and means connecting the rear end of the spring means to the rear of the longitudinal member and threshing mechanism.

9. In a harvester thresher, a wheeled support, a threshing mechanism carried by the wheeled support, a motor, means pivotally connecting one end of the motor to the wheeled support, and means extending from the threshing mechanism for supporting the other end of the motor.

10. In a self-propelled unitary harvester thresher, a transversely extending wheel carried support, a thresher mechanism comprising a longitudinally disposed housing and having its front end carried on the transverse support, a longitudinally extending frame member running alongside said housing and having its front end connected to the transverse support, a second transverse support connecting the rear ends of the housing and longitudinal frame member, said second support journally carrying a steerable tiller wheel, a longitudinally disposed power plant having its rear end carried on said longitudinal frame member, means including a hinge to support a forward portion of the power plant on said first transverse support, and means connecting the power plant to drive the wheels carrying the first transverse support and the thresher mechanism.

11. In a harvester thresher, a support having a pair of laterally spaced traction wheels, a threshing mechanism secured to the support and extending rearwardly thereof, a longitudinal member secured to the support and extending rearwardly thereof, ground-engaging means supporting the rear of the longitudinal member and the rear of the threshing mechanism, a motor, means pivotally connecting one portion of the motor to the support, means on the longitudinal member supporting another portion of the motor, and an operator's platform mounted on the support and the longitudinal member above the motor.

LEE P. MILLARD.
STUART D. POOL.

CERTIFICATE OF CORRECTION.

Patent No. 2,369,745. February 20, 1945.

LEE P. MILLARD, ET AL.

It is hereby certified that error appears in the printed specification of the above numbered patent requiring correction as follows: Page 6, second column, line 21, beginning with the words "In a harvester" strike out all to and including "motor" in line 26, comprising claim 9 and insert instead the following -

> --In a harvester thresher, a support having a pair of laterally spaced traction wheels, a threshing mechanism carried by the support to one side of a center line between the traction wheels and extending to one side of the support, a longitudinal member carried by the support at the other side of the center line and extending along the threshing mechanism, means connecting the longitudinal member to the threshing mechanism, a rotatable wheel mounted on the means, a motor, means pivotally connecting one end of the motor to the support, and means on the longitudinal member supporting the other end of the motor--;

and that the said Letters Patent should be read with this correction therein that the same may conform to the record of the case in the Patent Office.

Signed and sealed this 31st day of July, A. D. 1945.

(Seal)

Leslie Frazer
Acting Commissioner of Patents.